J. D. WEBBER.
WEIGHING AND PACKAGING APPARATUS.
APPLICATION FILED JAN. 10, 1914.
1,203,285.
Patented Oct. 31, 1916.
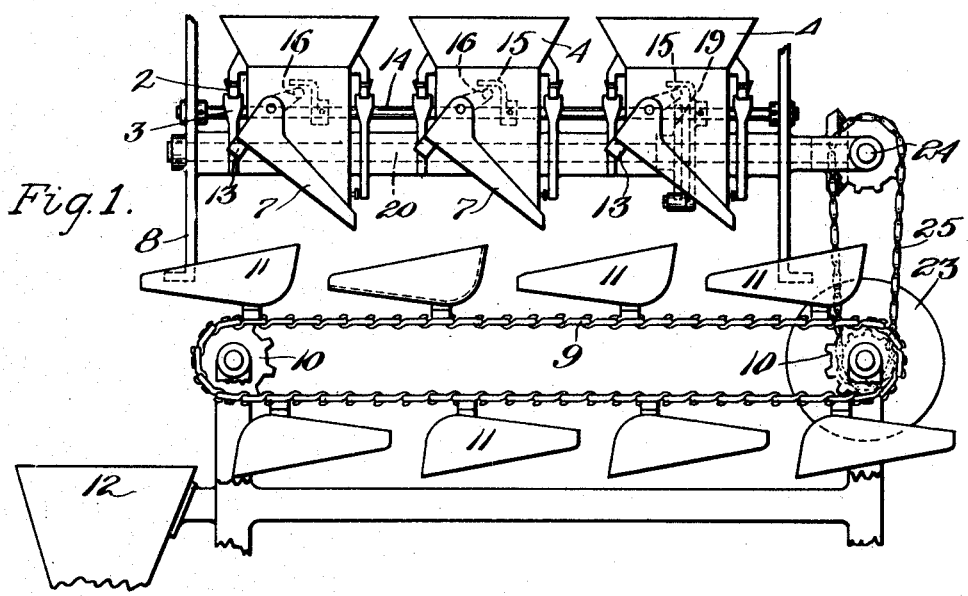
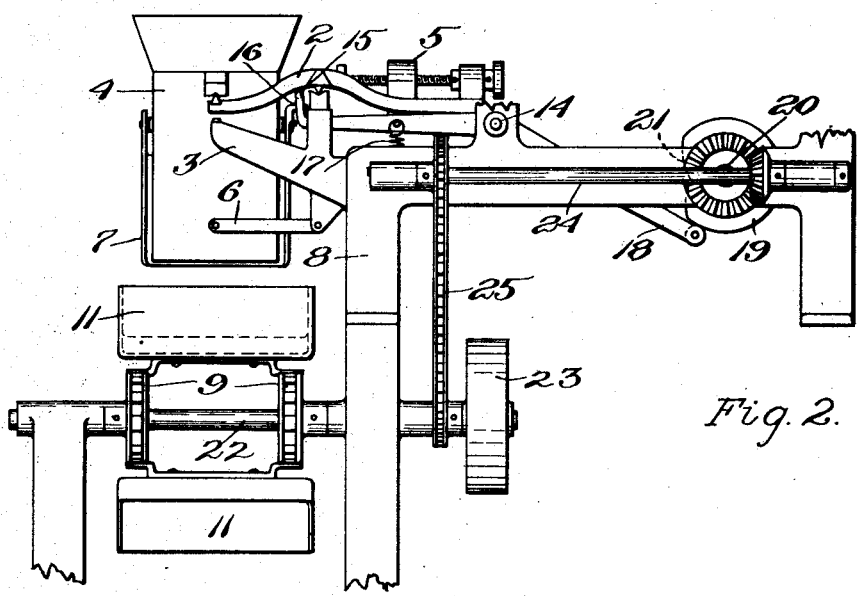
WITNESSES
INVENTOR
John D. Webber

UNITED STATES PATENT OFFICE.

JOHN D. WEBBER, OF BAYONNE, NEW JERSEY, ASSIGNOR, BY MESNE ASSIGNMENTS, TO RICHARD H. WRIGHT, OF DURHAM, NORTH CAROLINA.

WEIGHING AND PACKAGING APPARATUS.

1,203,285.   Specification of Letters Patent.   Patented Oct. 31, 1916.

Application filed January 10, 1914. Serial No. 811,364.

*To all whom it may concern:*

Be it known that I, JOHN D. WEBBER, a citizen of the United States, residing at Bayonne, in the county of Hudson and State of New Jersey, have invented new and useful Improvements in Weighing and Packaging Apparatus, of which the following is a specification.

This invention relates to apparatus for use in connection with the weighing and packaging of various materials of which a good example is finely-divided smoking tobacco, the physical characteristics of which are such as to cause it to flow or feed to a weighing scale so slowly that successive charges of material cannot be accurately weighed by the scale as rapidly as they can be packaged in the containers provided therefor. When this condition exists it is desirable to employ several scales for supplying the material to a single packaging apparatus in order that the latter may be run to its full capacity, and my present invention is intended to provide a simple and efficient apparatus adapted for use in such cases and so constructed as to deliver successively the charges of material weighed out by the several scales without danger of destroying the accuracy of the weights of the successive charges by mixing the same, or portions thereof, after they are discharged from the scales. This object is accomplished, and my invention is characterized, by the employment of a series of weighing machines arranged to discharge simultaneously into a corresponding series of receptacles on a conveyer which moves beneath the points of discharge of all the weighing machines and successively empties its receptacles, one at a time, at the place where each charge of material is transferred to the container in which it is to be put up, the details of my apparatus as preferably constructed and arranged being illustrated in the accompanying drawings, in which:—

Figure 1 shows in elevation such parts of the apparatus as need to be illustrated and described; and Fig. 2 is an elevation of the same parts, as viewed from the right hand end of Fig. 1.

In the particular apparatus illustrated three weighing machines are employed, but inasmuch as the weighing mechanism may be of any usual or suitable construction I have illustrated only the three scale beams 2 fulcrumed on fixed brackets 3, weighing buckets 4 and supported thereby, adjustable weighing weights 5, parallel motion links 6 for keeping the buckets upright, bucket closers 7, and certain associated parts hereinafter described which have to do more particularly with my present improvements.

The several weighing machines above referred to are supported side by side on a framework 8, and it is to be understood that the complete apparatus will include suitable means for delivering the material to be weighed into each bucket 4 and for cutting off the supply of material when a charge is completed in the bucket.

Beneath the line of weighing buckets 4 is located a conveyer of the endless-belt type, represented as consisting of two sprocket chains 9 passing around sprocket wheels 10 and running horizontally, said chains being provided with a series of receptacles 11 spaced apart at equal intervals corresponding to the spacing of the weighing buckets. The receptacles 11 are arranged to stand in upright position during their movement along the upper portion of the conveyer, which is assumed to travel from right to left in Fig. 1, and at the left hand end of the conveyer is placed a receiver 12 which is located in position to receive the material discharged by each receptacle 11 as it is tilted downward during the passage of the conveyer over the left hand sprocket wheels 10. This receiver 12 may deliver directly to the containers for the charges of material, or it may be associated with or form a part of a packaging apparatus, which is not shown in the drawings as it may be of any usual or suitable construction.

The closers 7 of the buckets 4 are so constructed and arranged that after any bucket has received a full charge and has descended, its closer will remain shut until it is subsequently opened at a predetermined time, this arrangement being adopted in order that all the buckets may be caused to discharge simultaneously. In the particular construction illustrated each closer 7 is provided with a counterweight 13 which suffices to overbalance the pressure of a full charge in the bucket and hold the closer shut unless it is forcibly opened, and for opening all the closers simultaneously I provide means such as a rock-shaft 14 carrying a series of fingers 15, one for each closer, each of which fingers is located over a projection 16 secured to the corresponding closer and arranged to move downward as the closer opens. A spring 17 draws the fingers 15 downward with sufficient force to open the closers whenever such movement is permitted, and an arm 18 secured to the rock-shaft 14 is arranged to be operated in opposition to the spring 17 by a cam 19 carried by a rotating countershaft 20, said cam being provided with a depression 21 which allows all the closers to be opened simultaneously at periodic intervals by the spring 17. At other times the fingers 15 are held in the elevated position shown in Figs. 1 and 2, and the closers are held shut by the respective counterweights 13.

The countershaft 20 is rotated at such a speed that each weighing machine is given sufficient time to complete the weighing of a charge between successive downward movements of the fingers 15, and the travel of the conveyer is so timed with respect to the operation of the weighing machines that at each discharge of the weighing buckets 4 three of the receptacles 11 are located in position to receive the respective charges of material, while during the interval between successive discharges of the weighing buckets the three filled receptacles pass from under the series of buckets and are replaced by the next three receptacles on the conveyer. By making the receptacles 11 of such length that their movement will not carry them beyond a receiving position under the buckets 4 during the emptying of the latter the conveyer may be given a continuous as distinguished from a step-by-step movement, and in the construction illustrated this arrangement is adopted, the conveyer being operated directly by the main driving shaft 22 which is continuously rotated by a belt pulley 23. The countershaft 20 is represented as geared to another countershaft 24 which is driven by the main shaft 22 through a sprocket connection 25, so that the predetermined timing of the movements of the various parts is maintained.

In operation, the weighing buckets 4 weigh out simultaneously three charges of the material being handled and then descend, whereupon the weighed charges are retained in the buckets until the fingers 15 are pulled downward by the spring 17 as above explained. When this occurs the closers 7 are opened simultaneously and the three charges of material are delivered into three successive receptacles 11, which at this time are moving beneath the three weighing buckets but without getting out of position to receive the full charges therefrom, and then the buckets rise and receive the next charges of material. While these are being weighed the filled receptacles 11 move from beneath the buckets, and as each receptacle reaches the left hand end of the conveyer it dumps its contents into the receiver 12, which is therefore supplied with charges of material one at a time but three times as fast as a single weighing machine would supply them. Thus in the use of the apparatus above described each weighing machine is given sufficient time for weighing with the desired degree of accuracy the successive charges of material which it delivers to the conveyer, and all the charges are delivered successively to their intended containers without danger of having the last portion of one charge mingled with and added to the next succeeding charge and thus affecting the desired equality of weight of the several charges, as has been found to occur in case a number of weighing machines are caused to discharge successively into a single hopper leading to a packaging machine.

It will be obvious that any desired number of weighing machines may be employed in connection with a single conveyer and receiver, and that various changes may be made in the construction and arrangement of the different parts of the apparatus, without in either case departing from my invention.

I claim:—

1. In an apparatus of the character described, the combination of a series of weighing mechanisms each including a weighing bucket adapted to retain a charge of material after it has been weighed therein, an endless-belt conveyer comprising a series of receptacles arranged to pass successively under the points of discharge of said buckets, means operating in synchronism with the conveyer for discharging the buckets simultaneously into a corresponding number of empty receptacles on the conveyer as soon as the same have replaced those previously filled, and means for discharging the filled receptacles successively.

2. In an apparatus of the character described, the combination of a series of weighing mechanisms each including a weighing bucket adapted to retain a charge of material after it has been weighed therein, an endless-belt conveyer comprising upper and lower portions extending beneath the points of discharge of said buckets and carrying on its outer face a series of equally-spaced receptacles having open front ends, whereby said receptacles are adapted to discharge successively as they pass from the upper to the lower portion of the conveyer, and means operating in synchronism with the conveyer for simultaneously discharging the buckets into a corresponding number of empty receptacles on the upper portion of the conveyer as soon as said empty receptacles have replaced those previously filled.

3. In an apparatus of the character described, the combination of a series of weighing mechanisms, each comprising a bucket having a closer adapted to remain closed against the weight of a charge of material in the bucket after the latter has descended, an endless-belt conveyer carrying a series of receptacles which are equally spaced apart in correspondence with the spacing of the buckets and move beneath the latter successively, means for opening the bucket closers simultaneously, and connections between said means and the conveyer whereby the discharge of the buckets is caused to occur after empty receptacles on the conveyer have replaced those previously filled.

4. In an apparatus of the character described, the combination of a series of weighing mechanisms, each comprising a weighing bucket and a closer therefor which is adapted to remain closed after the bucket has descended under the weight of a charge of material therein, an endless-belt conveyer carrying a series of receptacles which are equally spaced apart in correspondence with the spacing of the weighing buckets and move beneath the latter successively, a receiver into which said receptacles discharge successively and means connected to the conveyer and timed to operate in conjunction therewith for causing simultaneous discharge of said buckets.

5. In an apparatus of the character described, the combination of a series of weighing mechanisms each having a weighing bucket and a closer therefor, a counterweight for holding each closer shut against the weight of a charge of material in the corresponding bucket, stops for limiting the downward movement of said buckets, means acting in a downward direction on the several bucket closers for forcibly opening the latter simultaneously, a conveyer comprising a series of receptacles arranged to move successively beneath the several weighing buckets, and connections between the conveyer and the bucket-opening mechanism for causing the latter to operate after empty receptacles on the conveyers have replaced those previously filled.

In testimony whereof, I have hereunto subscribed my name this 13th day of December, 1913.

JOHN D. WEBBER.

Witnesses:
 WASHINGTON A. WILKINSON,
 HENRY F. DARSEY.

Copies of this patent may be obtained for five cents each, by addressing the "Commissioner of Patents, Washington, D. C."